United States Patent

[11] 3,552,542

| [72] | Inventors | William R. Comber<br>Holland;<br>Elmer J. Boer, Zeeland, Mich. |
|---|---|---|
| [21] | Appl. No. | 702,414 |
| [22] | Filed | Feb. 1, 1968 |
| [45] | Patented | Jan. 5, 1971 |
| [73] | Assignee | U.S. Industries, Inc.<br>a corporation of Delaware, by mesne assignments |

[54] PIT CLEANER AND ELEVATOR FOR ANIMAL HOUSES
16 Claims, 4 Drawing Figs.

[52] U.S. Cl. ............................................. 198/174, 198/170
[51] Int. Cl. ....................................... B65g 19/10
[50] Field of Search ........................................ 198/175, 170, 172, 174, 224

[56] References Cited
UNITED STATES PATENTS

| 2,812,924 | 11/1957 | Hapman | 198/174X |
| 3,318,441 | 5/1967 | Keen et al. | 198/175 |
| 3,409,120 | 11/1968 | Van Huis | 198/224 |

FOREIGN PATENTS

| 937,999 | 12/1955 | Germany | 198/172 |
| 844,265 | 8/1960 | Great Britain | 198/174 |

Primary Examiner—Gerald M. Forlenza
Assistant Examiner—Frank E. Werner
Attorney—Price, Heneveld, Huizenga & Cooper ABSTRACT: A plurality of mutually spaced scraper blades secured to an endless conveyor member comprising a pair of spaced chains, to be pulled thereby along the length of a manure pit in an animal or poultry house to clean such pit, wherein a raillike load-bearing member is rigidly secured to each side of such pit and each scraper blade has a runnerlike member arranged to slide along such rail when the blade is moved through the pit, in order to positively hold the blade downwardly with respect to the bottom of the pit and resist movement of the blade away from the pit bottom as a result of contact with relatively fixed obstructions. Each spaced scraper blade has a side extremity arranged to scrape a side of the pit, and the blades are arranged in an alternating fashion wherein successive blades scrape opposite sides of the pit. The conveyor chains are arranged in a waving, undulating pattern such that tension forces applied to the chains when the blades are pulled through the pit tend to straighten the chains from their undulating pattern and to bias the scraping side extremities of the blades against their respective sides of the pit, to facilitate scraping thereof.

PIT CLEANER AND ELEVATOR FOR ANIMAL HOUSES

BACKGROUND

Pit cleaners of the type incorporating a plurality of spaced scraper blades have been used for some time in animal and poultry houses in order to effect generally automated cleaning of the manure collection pits in such houses. While certain of such systems operate in a reciprocating manner in which the scraper blades have a limited excursion, other such systems utilize loop-type or belt-type conveyor members to continuously move the scraper blades around a closed path, only one-half or less of which comprises a working stroke while the remainder forms the blade return stroke. The latter type of pit cleaner is particularly useful in a primary or cross pit located centrally within an animal house, into which a number of lateral or feeder pits from the various stalls communicate; often, it is desirable for the pit cleaner utilized in such a primary or cross pit to extend angularly upward out of the pit itself to form an elevator by which the collected debris in the cross pit may be transferred directly out of the animal house. A typical such system as this is shown in U.S. Pat. No. 3,318,441, issued to Keen et al.

In the continuous circulation or belt-type pit cleaner the scraper blades are usually moved by a somewhat flexible tension member, and such systems have in the past encountered a significant problem in maintaining the scraper blades against the bottom of the pit with sufficient force to do a reasonably thorough job of cleaning. Similarly, the cleaning of the sides of the pits has been a particularly troublesome factor, as have the corners where the sides and the bottom of the pit meet. The problem of cleaning the sides of the pits and the lower corners has been amplified and worsened as a result of the fact that the pits themselves are often built by the individual farmers and poultry growers and at best they are likely to be far from exact or uniform structures; in fact, such pits almost always have at least a moderate variance in their width along much of their length. Finally, the loop or belt-type pit cleaner has always been subject to operational difficulties and structural failure and breakage when, as often occurs, the scraper blade encounters firmly fixed obstacles such as dried and hardened manure deposits which can often attain an apparent hardness equaling that of concrete.

THE PRESENT INVENTION

In accordance with the present invention, an improvement in continuous or belt-type conveyor pit cleaners is provided, by which greatly improved operational results and performance is achieved by virtue of the conjunction of new and altered structures. The pit cleaner of the present invention is so constructed that its scraper blades are normally held in a positive manner in firm scraping engagement with the bottom of the pit, yet the blades are permitted to undergo a moderate rocking type of movement when rigid obstacles are encountered. This allows such obstacles to force the bottom extremity of the blade upward and over the top of them, thereby scraping the top of the obstacle but not allowing the blade to catch or jam directly against it. Further, a new arrangement for scraping the sides of the pit is provided, by which the blades are biased against the sides of the pit as a function of the tension applied to the conveyor member in order to pull the blades along the pit; however, this biasing of the blades toward the sides of the conveyor is a yieldable force which allows the blades to position themselves against the pit sides regardless of variations in the width of the pit, and it also allows the blades to move inwardly away from the pit sides in the event that obstacles are encountered.

Briefly stated, the present invention comprises a plurality of spaced scraper blades rigidly secured to an endless or loop-type conveyor member, preferably comprised of a pair of parallel chains or other such flexible tension members. The various scraper blades have runner elements which bear against fixed load-bearing members and slide along the latter as the blades are moved to thereby positively hold the blades in firm contact with the bottom of the pit. Such runners provide for a rocking movement of the blades when obstacles are encountered on the pit bottom, at which time the blades pivot or tilt an integral segment of the conveyor member, such as one of its links. Also, one or the other side of each blade is arranged to scrape the adjacent sidewall of the pit, with the blades being alternated in a sequence wherein successive blades scrape opposite sides of the pit. Moreover, the blades are attached to the conveyor member such that the latter is given an undulating form which tends to be straightened by tension applied to the conveyor member; this straightening tendency urges the scraping sides of the blades against their respective sides of the pit.

DRAWINGS

PREFERRED EMBODIMENT

Figure 1:
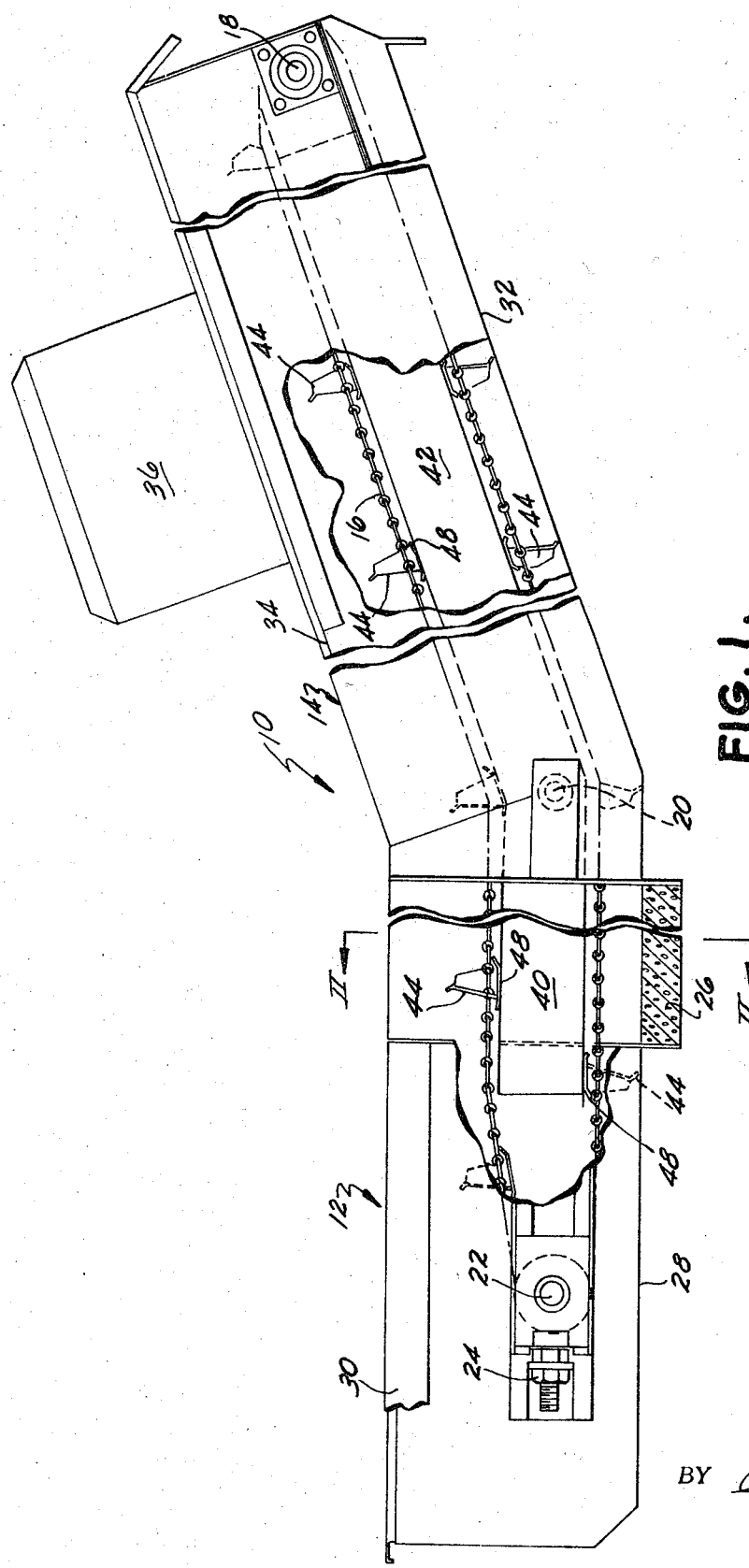
FIG. 1 is a fragmentary side elevation of the present pit cleaner and elevator.

The general nature of the overall pit cleaner and elevator 10 is best seen in FIG. 1. This includes a generally horizontal pit cleaner portion 12 which extends directly into and becomes a vertically inclined elevator portion 14, through both of which runs a continuous conveyor member 16 which is of the belt or loop type. More specifically, the conveyor member 16 is preferably a pair of side-by-side, mutually space, endless loops of chain, preferably a flat utility chain of a type finding considerable use on farms and the like. As illustrated, the conveyor member chains 16 pass around a driving shaft and sprocket means 18 located at the top of the elevator portion 14, pass over an intermediate idler assembly 20 located at the juncture of the elevator and pit cleaner portions, and pass around an idler assembly 22 near the end extremity of the pit cleaner portion 12. Preferably, the rearward idler assembly 22 is adjustable lengthwise of the pit cleaner portion, as by means of threaded members 24, to provide for proper tensioning of the conveyor member chains 16.

Structurally, the pit cleaner portion 12 comprises an elongated pit or channel 26 of U-shaped cross section (FIGS. 1 and 2) which is typically of poured concrete and which extends over a desired length within the animal house, in the floor thereof. The rearward end extremity of the pit 26 (seen at the left in FIG. 1) is closed by a generally rectangular boxlike housing 28 (FIG. 1), preferably having a slidable cover 30, which housing protectively encloses the idler assembly 22. The elevator portion 14 is defined by an enclosure comprising essentially an elongated trough 32 of sheet metal or the like, having a removable cover 34. The elevator trough 32 angles upwardly with respect to the generally horizontal pit cleaner portion 12, typically at an angle of from twenty to 30°, for the purpose of moving the debris which has been cleaned out of the pits upwardly, away from the pits and out of the animal house itself. A housing 36 located atop the elevator portion 14 encloses a drive means of a conventional nature, such as an electric motor and a gear reducer which drives a sprocket and drive chain (not specifically shown) communicating with the aforementioned driving shaft and sprocket means 18 located at the upward extremity of the elevator portion 14. As indicated by the transverse seam indicated at 38, the elevator trough 32 may be made in sections which are secured together by bolts or the like.

Inside both the pit cleaner portion 12 and the elevator portion 14 is located a pair of spaced, oppositely disposed rail members, designated 40, 40' in the pit cleaner portion (FIGS. 1 and 2), and 42 in the elevator portion. These rail members are secured against the sidewalls of the pit and elevator in a secure, rigid manner, so as to serve as a load-bearing means. Rails 40 and 42 may be of any desired material, but hardwood dimension lumber has been found to provide very satisfactory results at nominal cost. As illustrated, the rail members 40, 40' in the pit cleaner portion 12 extend forwardly therewithin to a point near the juncture of the pit cleaner and the elevator portion, near the location of the intermediate idler assembly 20, and the rails 42 in the elevator portion extend from just below the drive shaft and sprocket 18 at the top of the latter downwardly toward the rails 40 in the pit cleaner portion, such that the rails 40 and 42 may form a substantially continuous structure.

The pit cleaner and elevator apparatus of the invention includes a plurality of scraper blade means which are pulled through the pit and up the elevator portion by the conveyor chain 16 for the purpose of cleaning the concrete pit and moving the cleanings up the elevator trough and out of the building. Such scraper means include a plurality of scraper blades 44, each of which extends substantially completely across the entire width of the concrete pit (FIG. 2) and which, in its travel from the adjustable idler 22 at the rearward end of the pit up to the driving shaft and sprocket means 18 at the top end of the elevator, scrapes the bottom of the pit to clean and collect manure and other debris therefrom. Each of the scraper blades 44 is rigidly attached (as by welding) to a single link in each of the spaced conveyor chains 16, 16' (FIGS. 2 and 3), and each scraper blade 44 has a generally U-shaped channellike support rib 46, the web or medial portion of which is rigidly secured flush against the back of the scraper blade, whereas the outwardly extending legs of such support ribs are secured at their tops to the aforesaid individual links in the conveyor chain 16.

Figure 2:
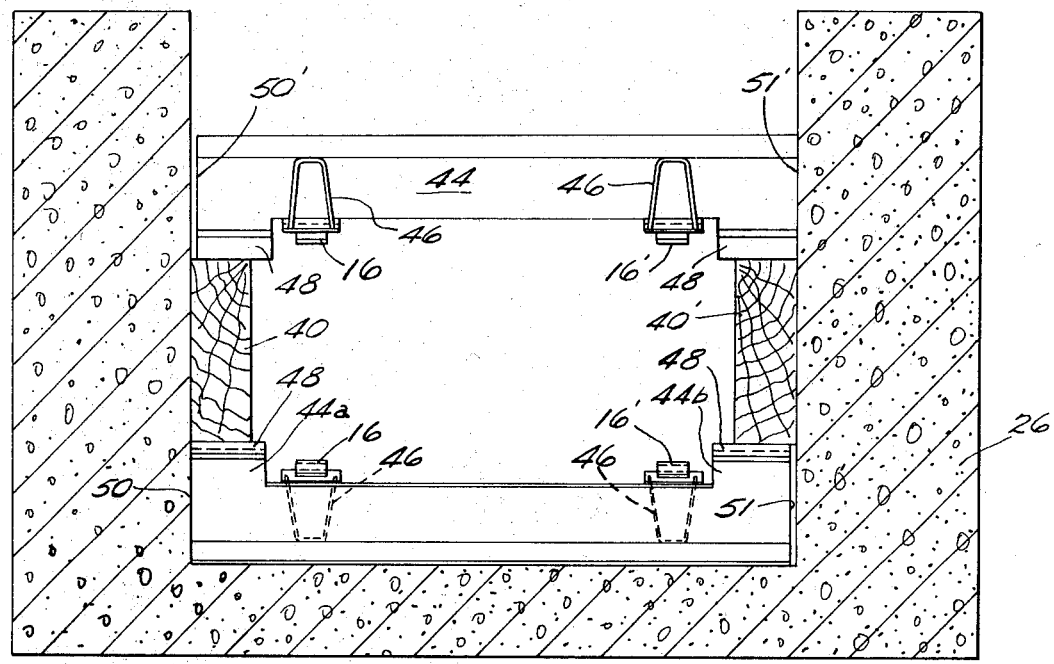
FIG. 2 is a sectional elevation taken through the plane II—II of FIG. 1.
Figure 3:
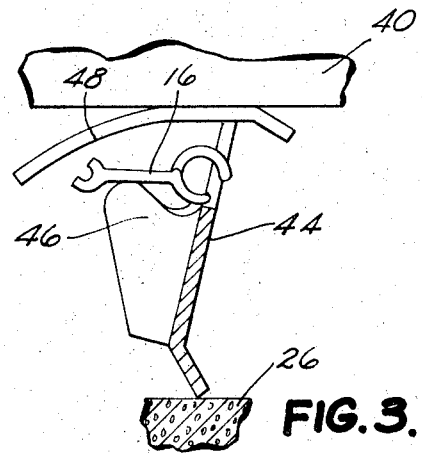
FIG. 3 is an enlarged side elevation of a single scraper element.

As illustrated in FIG. 2, the spacing between the conveyor chains 16, 16' is somewhat less than the total width of the scraper blades 44, such that the two spaced conveyor chains extend over and attach to the various scraper blades inwardly of the end extremities thereof, where the scraper blades have elevated upright end portions 44a and 44b (FIG. 2) which give them a somewhat U-shaped cross-sectional configuration. Directly atop each of the uprights 44a and 44b is mounted a runner element 48, whose purpose is to slide along the underside of the oppositely disposed rail members such as 40, 40', to thereby maintain firm scraping contact between the bottom edge of the blade 44 and the bottom of the concrete pit 26. Because of this function, each of these uprights and their associated runner 48 may be collectively referred to as a positioning and holding means which coacts between the load-bearing rails and the scraper blades.

The runner elements 48 comprise a metal shoe and are basically rigid, although they may be slightly or stiffly flexible if desired in order to permit limited displacement of the scraper blade upwardly from the bottom of the pit; preferably, however, the runners 48 are gradually curved rearwardly of the scraper blade to provide a rounded heel portion by which the scraper blades may rock their respective runners against the underside of the rail members in the event that the scraper blade encounters a relatively fixed obstacle along the bottom of the pit. During such rocking movement, the two-point connection between each scraper blade and its individual link in the chain conveyor 16 (afforded by attaching the link to spaced joints represented by the scraper blade and the support rib 46) affords a moment arm by which such individual link may be tilted or topped with respect to the general plane in which its companion links are positioned, even though the chain conveyor is under at least moderate tension. Thus, whenever obstacles are not encountered, each scraper blade is urged against the bottom of the pit for optimum cleaning by the sliding contact of the runner element 48 and the rails 40, 42. When rigid or fixed obstacles are encountered, however, any blade meeting such obstacle is able to rock or tilt at least slightly to pass over the obstacle and scrape along the top thereof rather than to catch or hang upon the obstacle with resultant structural damage to the mechanism.

As will be understood, the forward travel of any scraper blade from the rearward extremity of the pit portion 12 to the top extremity of the elevator portion 14 comprises a working stroke, whereas the return passage of each such blade is not a working stroke as such; nonetheless, as illustrated in FIGS. 1 and 2, the runner elements 48 of each scraper blade not only slide along the top edge of the rail members during the return stroke, but also slide along the top edge of the rail members during the return stroke, to properly position and guide the scraper blades at all times during its movement.

An important feature of the present invention resides in the particular positioning within the pit 26 of each of the plurality of scraper blades 44. As may be seen in FIG. 2, the scraper blade located at the bottom of pit 26 has its leftward edge extremity 50 in scraping engagement with the adjacent side of the concrete pit, whereas the opposite side extremity 51 of this blade is spaced away from the opposite sidewall of the pit at least slightly; on the other hand, the scraper blade designated 44' seen at the top in FIG. 2 has its leftward edge 50' spaced away from the adjacent side of the concrete pit, whereas the rightward edge 51' of this blade is in scraping engagement with the side of the pit adjacent it.

Figure 4:
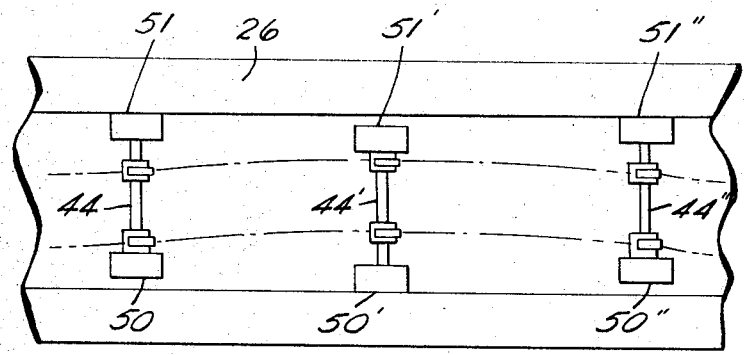
FIG. 4 is a fragmentary overhead plan view showing a sequence of blades and their side-scraping arrangement.

The general scheme of this arrangement is illustrated in FIG. 4, where a series of three scraper blades designated 44, 44', and 44" are illustrated. The first such blade has its upper edge 51 in scraping engagement with the adjacent edge of the pit 26, as does the third such blade 44"; on the other hand, the blade 44' located in the center has its upper edge 51' spaced from that side of the pit. Blade 44', however, has its lower edge 50' in scraping engagement with the side of the pit adjacent it, whereas blades 44 and 44" have their lower edges 50, 50" spaced from this side of the pit. Thus, it will be apparent that alternate blades along the entire length of the apparatus have a common side edge in scraping engagement with a first side of the pit (and of the elevator trough as well), whereas the remaining alternating blades have their opposite side edge in scraping engagement with the opposite side of the pit and the elevator.

The spaced conveyor members or chains 16 are not arranged in straight parallel lines across the top of each successive scraper blade along the length of the apparatus; on the contrary, these conveyor chains are arranged in a wavelike, undulating pattern in which they are serpentined at least slightly between the opposite sides of the pit, with high and low points in their undulation occurring at the alternating sets of conveyor blades which have their common sides in engagement with a common side of the pit. For example, in this undulating arrangement scraper blades such as 44 and 44" have the conveyor members attached thereto with a spacing from the sidewall of the pit engaged by the sides 51, 51" of these blades which is greater than the spacing from this same wall which the two conveyor chains have at their respective points of attachment to a blade such as blade 44', which does not have an end or edge extremity in scraping engagement with that pit wall, but which instead scrapes the opposite such sidewall of the pit.

The result produced by the aforementioned arrangement of the scraper blades and their conveyor chains is a positive forcing of each side-scraping blade edge against its adjacent pit sidewall, brought about by the tensioning of the conveyor chains 16, 16'. That is, the tension forces applied to the conveyor chains to pull them about their circuitous path and thereby pull the various scraper blades along the pit tend to straighten the chains from their undulating form, thereby in effect pressing the scraping side edge of each similarly positioned scraper blade against the adjacent sidewall of the pit, while simultaneously using each such blade as a support to force the scraping side edges of the blades located therebetween against the opposite sidewall of the pit, thereby greatly enhancing the cleaning of the sides of the pit.

It is entirely conceivable that upon examining the foregoing disclosure, those skilled in the art may devise embodiments of the concept involved which differ somewhat from the embodiment shown and described herein, or may make various changes in structural details to the present embodiment.

We claim:

1. Pit cleaner and elevator apparatus for animal houses and the like, comprising in combination: a scraper means including a blade member arranged to be slid along the bottom of such pit, lengthwise thereof; driving means coupled to said scraper means for moving said blade member along said pit; load-bearing means rigidly mounted above said pit bottom; and said scraper means further including a positioning and holding means which coacts between said load-bearing means and said blade member to positively hold the latter downward in predetermined proximity to said pit bottom, said positioning and holding means including a runnerlike element arranged to slide along said load-bearing means as said blade member is slid along said pit bottom, said runnerlike element having curved heel portions for rocking upon said load-bearing means, to provide for rocking movement of said blade member in response to said blade encountering a firmly fixed obstacle in said pit.

2. The pit cleaner apparatus of claim 1, wherein said load-bearing means defines a pair of elongated rail structures and such structures are mutually spaced, and wherein said positioning and holding means includes a pair of said runnerlike elements, each such element arranged to slide along one such rail structure as said blade member is slid along said pit.

3. The pit cleaner apparatus of claim 2, wherein said rails in said pair thereof are secured to oppositely disposed sides of such pit.

4. The pit cleaner apparatus of claim 1, wherein said driving means moves said blade member forward along said pit in a working stroke and also moves such blade rearwardly in a nonworking return stroke, and wherein said runner element slides along said load-bearing means during both such strokes.

5. The pit cleaner apparatus of claim 4, wherein said blade member travels generally beneath said load-bearing means during said working stroke and generally above said load-bearing means during said return stroke.

6. The pit cleaner apparatus of claim 5, wherein said driving means includes an endless loop-type conveyor member and said scraper means includes a plurality of said blade members attached to such conveyor member in spaced-apart relationship.

7. The pit cleaner apparatus of claim 6, wherein at least one of said runnerlike elements effectively coacts between each such blade member and said load-bearing means.

8. The pit cleaner apparatus of claim 7, wherein a number of individual such runner elements is provided which is at least equal to the number of said blade members, each such blade member carrying at least one such runner element.

9. The pit cleaner apparatus of claim 7, wherein said blade members are each rigidly secured to said conveyor member and wherein said conveyor member is at least slightly flexible along its length.

10. The pit cleaner apparatus of claim 9, wherein each of said blade members is rigidly secured to said conveyor member at a pair of points which are at least slightly spaced apart along the length of said conveyor member, said spaced points defining a segmental portion of said conveyor member which is movable with respect to other such portions but which is itself generally rigid and inflexible.

11. The pit cleaner apparatus of claim 10, wherein said conveyor member comprises a chain, and wherein each of said segmental portions comprises a link in such chain.

12. The pit cleaner apparatus of claim 10, wherein both said segmental portion of said conveyor member and said runner element are disposed generally parallel to the bottom of said pit, with portions of each thereof lying in the same vertical plane.

13. The pit cleaner apparatus of claim 12, wherein said runner element is positioned higher than said segmental portion, and wherein said runnerlike element has curved heel portions for rocking upon said load-bearing means, to provide for rocking movement of said blade member in response to said blade encountering a firmly fixed obstacle in said pit, said segmental portion being tilted at the said spaced points at which it is secured to said blade member during such rocking movement.

14. Pit cleaner and elevator apparatus for animal houses and the like, comprising in combination: a scraper means including a blade member arranged to be slid along the bottom of such pit, lengthwise thereof; driving means coupled to said scraper means for moving said blade member along said pit; load-bearing means rigidly mounted above said pit bottom; said scraper means further including a positioning and holding means which coacts between said load-bearing means and said blade member to positively hold the latter downward in predetermined proximity to said pit bottom, said driving means including a conveyor member having a tension member of at least some flexibility, and said scraper means including a plurality of said blade members and attachment means securing such members to such tension member in spaced-apart relationship; said attachment means positioning certain first ones of said blade members on said tension member such that only one end thereof scrapes along a sidewall of said pit and positioning certain second ones of said blade members on said tension member such that only one end thereof scrapes along a sidewall of said pit; said attachment means further positioning said first and second blade member ends to scrape only opposite sidewalls of said pit; and said attachment means securing said tension member and blade members together in a manner such that tension applied to said tension member by a pulling force tends to force the said one ends of said blade members against the respective opposite sidewalls of said pit along which such blade end scrapes.

15. The pit cleaner apparatus of claim 15, wherein said blade members whose said one end scrapes along one sidewall of said pit are located along said conveyor member in a generally alternating manner with respect to said blade members whose said one end scrapes along the other sidewall of said pit, and wherein said conveyor member is attached to said generally alternating blade members such that said conveyor member takes on at least a slightly undulating form.

16. The pit cleaner apparatus of claim 15, wherein a number of individual such runner elements is provided which is at least equal to the number of said blade members, each such blade member carrying at least one such runner element.